US009082228B2

United States Patent
Gribel et al.

(10) Patent No.: US 9,082,228 B2
(45) Date of Patent: Jul. 14, 2015

(54) ANALYTICAL MOTION BLUR RASTERIZATION WITH COMPRESSION

(75) Inventors: Carl Johan Gribel, Lund (SE); Michael Doggett, Lund (SE); Tomas G. Akenine-Möller, Lund (SE)

(73) Assignee: Intel Corporation, Santa Clara, CA (US)

(*) Notice: Subject to any disclaimer, the term of this patent is extended or adjusted under 35 U.S.C. 154(b) by 635 days.

(21) Appl. No.: 13/004,928

(22) Filed: Jan. 12, 2011

(65) Prior Publication Data

US 2012/0177287 A1 Jul. 12, 2012

(51) Int. Cl.
- *G09G 5/00* (2006.01)
- *G06K 9/48* (2006.01)
- *G06T 11/40* (2006.01)
- *G06T 13/80* (2011.01)
- *G06T 9/00* (2006.01)
- *H04N 19/90* (2014.01)
- *H04N 19/436* (2014.01)

(52) U.S. Cl.
CPC . *G06T 11/40* (2013.01); *G06T 9/00* (2013.01); *G06T 13/80* (2013.01); *H04N 19/90* (2014.11); *H04N 19/436* (2014.11)

(58) Field of Classification Search
CPC ............ G06T 2207/20201; G06T 5/003; G06T 11/40; G06T 13/80; G06T 9/00; H04N 19/00945; H04N 19/00521
USPC ......... 345/422, 619, 620–628, 631, 639–640, 345/473–475; 382/166, 232–253; 375/240.12–240.17
See application file for complete search history.

(56) References Cited

U.S. PATENT DOCUMENTS

| | | | | |
|---|---|---|---|---|
| 5,734,744 | A * | 3/1998 | Wittenstein et al. | 382/166 |
| 6,211,882 | B1 * | 4/2001 | Pearce et al. | 345/419 |
| 6,633,297 | B2 * | 10/2003 | McCormack et al. | 345/506 |
| 7,088,358 | B2 * | 8/2006 | Aharon et al. | 345/419 |
| 7,446,780 | B1 * | 11/2008 | Everitt et al. | 345/611 |
| 8,217,949 | B1 * | 7/2012 | Carpenter et al. | 345/474 |
| 2002/0126138 | A1 * | 9/2002 | Shekter | 345/660 |
| 2003/0165198 | A1 * | 9/2003 | Chen et al. | 375/240.29 |
| 2006/0250520 | A1 * | 11/2006 | Han et al. | 348/398.1 |
| 2007/0098271 | A1 * | 5/2007 | Kamata | 382/232 |
| 2007/0254617 | A1 * | 11/2007 | Fallon et al. | 455/337 |
| 2008/0279282 | A1 * | 11/2008 | Kobayashi et al. | 375/240.24 |
| 2009/0087104 | A1 * | 4/2009 | Nakate | 382/224 |

(Continued)

OTHER PUBLICATIONS

Fabrice Moscheni, Sushil Bhattacharjee, Murat Kunt, Spatiotemporal Segmentation Based on Region Merging, 1998, IEEE Transactions on Pattern Analysis and Machine Intelligence, 20(9):897-915.*

(Continued)

*Primary Examiner* — Xiao Wu
*Assistant Examiner* — Michael J Cobb
(74) *Attorney, Agent, or Firm* — Trop, Pruner & Hu, P.C.

(57) ABSTRACT

A rasterizer, based on time-dependent edge equations, computes analytical visibility in order to render accurate motion blur. An oracle-based compression algorithm for the time intervals lowers the frame buffer requirements. High quality motion blurred scenes can be rendered using a rasterizer with rather low memory requirements. The resulting images may contain motion blur for both opaque and transparent objects.

20 Claims, 5 Drawing Sheets

(56) References Cited

U.S. PATENT DOCUMENTS

| | | | | |
|---|---|---|---|---|
| 2009/0219281 | A1* | 9/2009 | Maillot | 345/419 |
| 2010/0231732 | A1* | 9/2010 | Baxansky et al. | 348/208.4 |
| 2011/0181606 | A1* | 7/2011 | Sumner et al. | 345/474 |
| 2012/0126802 | A1* | 5/2012 | Yamamoto | 324/239 |
| 2014/0009467 | A1* | 1/2014 | Akenine-Moller et al. | 345/422 |
| 2014/0327680 | A1* | 11/2014 | Hoppe et al. | 345/473 |

OTHER PUBLICATIONS

Mark Last, Yaron Klein, and Abraham Kandel, Knowledge Discovery in Time Series Databases, 2001, IEEE Transactions on Systems, Man, and Cybernetics-Part B: Cybernetics, 31(1):160-169.*

W. Frank Ableson, Charlie Collins, Robi Sen, Unlocking Android: A Devloper's Guide, 2009, Manning Publications Co, Greenwich, CT, pp. 242-246.*

S.P. Mudur, P.A. Koparkar, Interval Methods for Processing Geometric Objects, 1984, IEEE Computer Graphics and Applications, 4(2):7-17.*

Paulo Cezar, Pinto Carvalho, Luiz Velho Mathematical Optimization in Graphics and Vision, 2003, Course Notes—SIGGRAPH 2003, Instituto de Matematica Pura e Aplicada, IMPA, Rio de Janeiro, Brazil.*

Jon Hasselgren, Performance Improvements for the Rasterization Pipeline, 2009, Dissertation, Lund Institute of Technology, Lund Univeristy, Lund, Sweeden, ISBN: 978-91-976939-2-9.*

Kayvon Fatahalian, Edward Luong, Solomon Boulos, Kurt Akeley, William R. Mark, Pat Hanrahan, Data-Parallel Rasterization of Micropolygons with Defocus and Motion Blur, 2009, Proceedings of the Conference on High Performance Graphics 2009, pp. 59-68.*

Akenine-Moller T., Munkberg J., Hasselgren J.: Stochastic Rasterization using Time-Continuous Triangles. In Graphics Hardware (2007), pp. 7-16. 2.

Catmull E.: An Analytic Visible Surface Algorithm for Independent Pixel Processing. In Computer Graphics (Proceedings of ACM SIGGRAPH 84) (1984), pp. 109-115. 1, 2.

Cook R. L., Carpenter L., Catmull E.: The Reyes Image Rendering Architecture. In Computer Graphics (Proceedings of ACM SIGGRAPH 87) (1987), pp. 95-102. 1, 2.

Deering M., Winner S., Schediwy B., Duffy C., Hunt N.: The Triangle Processor and Normal Vector Shader: A VLSI System for High Performance Graphics. In Computer Graphics (Proceedings of ACM SIGGRAPH 88) (1988), pp. 21-30. 1.

Grant C. W.: inegraed Anaytc Spatal and Temporal Ant-Alasng or Poyhedra in 4-Space. In Compute Graphcs (Proceedings of ACM SIGGRAPH 85) (1985), pp. 79-84. 1, 2.

Haeberli P., Akeley K.: The Accumulation Buffer: Hardware Support for High-Quality Rendering. In Computer Graphics (Proceedings of ACM SIGGRAPH 90) (1990), pp. 309-318. 1.

Korein J., Badler N.: Temporal Anti-Aliasing in Computer Generated Animation. In Computer Graphics (Proceedings of ACM SIGGRAPH 83) (1983), pp. 377-388. 1, 2, 9.

Ragan-Kelley J., Lehtinen J., Chen J., Doggett M., Durand F.: Decoupled Sampling for Real-Time Graphics Pipelines. Tech. Rep. MIT-CSAIL-TR-2010-015, Mar. 29, 2010. 2, 10.

* cited by examiner

ANALYTICAL MOTION BLUR RASTERIZATION WITH COMPRESSION

BACKGROUND

This relates to digital image processing and, particularly, depictions of motion blurring and compression techniques.

Motion blur is generated when the shutter of the camera is open for a finite time, and some relative motion appears inside the field of view of the camera. It is an effect that is important for offline rendering for feature films, since the frame rate is rather low (~24 frames per second). With motion blur in the rendered images, apparent jerkiness in the animation can be reduced or removed entirely. However, motion blur is also becoming an important visual effect for real-time rendering, e.g., for games. In order to get good performance, various rather crude approximations, that may or may not apply in all cases, are used.

In general, motion blur rendering can be divided into two parts, namely, visibility determination and shading computations. Most solutions that converge to a correctly rendered image are based on point sampling. The more samples that are used the better image is obtained, and at the same time, the rendering cost goes up. In many cases, one can obtain reasonable results with rather few shader samples compared to the number of visibility samples. For example, RenderMan uses only a single shader sample for motion-blurred micro polygons.

DETAILED DESCRIPTION

Figure 1:
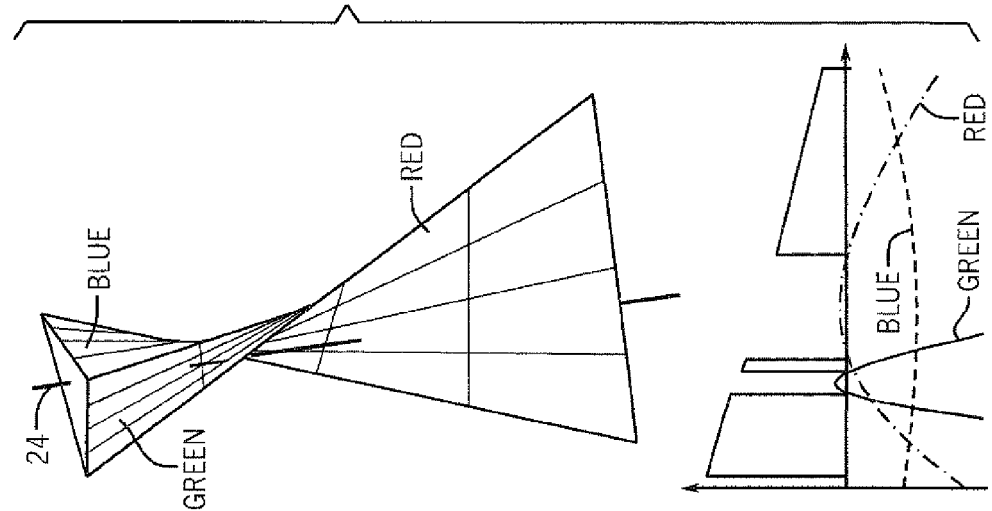
FIGS. 1 and 2 include depictions, at the top, of side surfaces rendered as patches with the corresponding depth function, plotted underneath.

The motion blur visibility problem may be solved analytically in order to avoid sampling noise. One embodiment involves rasterization of motion-blurred triangles with analytical visibility. However, a planar polygon with n number of vertices may be used.

Assume that the entire transform matrix, including projection, for a vertex is called M. A vertex in homogeneous clip space is then obtained as $|p=M\bar{p}$, where $\bar{p}$ is the vertex in three-dimensional object space, and p is the resulting four-dimensional vertex in homogeneous clip space, i.e., before division by the w-component. To simplify the derivation, we use the following notation: $\hat{p}=(p_x,p_y,p_w)$, which is a scaled and translated version of the point in camera space. This can be confirmed by looking at the definition of the projection matrix in OpenGL and DirectX.

The standard (no motion) edge function, in homogeneous form, through two vertices, say and $\hat{p}^0$ and $\hat{p}^1$, is:

$$e(x, y, w) = (\hat{p}^1 \times \hat{p}^0) \cdot (x, y, w) = ax + by + cw. \quad (1)$$

A sampling point, (x,y,w), is inside the triangle if $e_i(x,y,w) \leq 0$ for $i \in \{0,1,2\}$, i.e. for the three edges of the triangle. Next, this is extended with a time dimension.

Assume that the vertices move linearly from the beginning of a frame, at t=0, to the end for a frame, at t=1. At t=0, we denote the vertices as $q^i$, and we call them $r^i$ at t=1. Since there is no bar nor a hat on the vertices, all $q^i$ and $r^i$ are in homogeneous clip space. A linearly interpolated vertex is then given as:

$$p^i(t) = (1-t)q^i + tr^i, \quad (2)$$

for a certain instant $t \in [01]$. The coefficients of a time-dependent edge equation are given by:

$$(a,b,c) = (\hat{p}^1 \times \hat{p}^0) = ((1-t)\hat{q}^1 + t\hat{r}^1) \times ((1-t)\hat{q}^0 + t\hat{r}^0) = t^2 f + tg + h, \quad (3)$$

where:

$$h = \hat{q}^1 \times \hat{q}^0,$$

$$k = \hat{q}^1 + \hat{r}^0 + \hat{r}^1 \times \hat{q}^0,$$

$$f = h - k + \hat{r}^1 \times \hat{r}^0,$$

$$g = -2h + k. \quad (4)$$

Each edge equation is now a function of time consisting of three functions: (a(t), b(t), c(t)), where, for example, $a(t) = f_x t^2 + g_x t + h_x$. Finally, the entire time-dependent edge equation is:

$$e(x,y,t) = a(t)x + b(t)y + c(t), \quad (5)$$

where we have set w=1 since rasterization is done in screen space (x,y).

For now, we assume that each pixel has a single sample point at $(x_0, y_0)$. Extensions to multi-sampling and super-sampling just increase the sampling rate. If we consider a particular pixel, then $(x_0, y_0)$ are constant. In this case, the time-dependent edge function becomes a function of time, t, alone:

$$e(x_0, y_0, t) = e(t) = a(t)x_0 + b(t)y_0 + c(t). \quad (6)$$

This expression can be expanded using Equation 3:

$$e(t) = t^2(f_x x_0 + f_y y_0 + f_z) + t(g_x x_0 + g_y y_0 + g_2) + \quad (7)$$

$$(h_x x_0 + h_y y_0 + h_z)$$

$$= \alpha t^2 + \beta t + \gamma,$$

where $(\alpha, \beta, \gamma)$ are constants for a certain sample point, $(x_0, y_0)$. Hence, each edge equation is a quadratic function in t. Next, we introduce a binary inside-function, i(t), as:

$$i(t) = \begin{cases} 1, & \text{when } e(t) \leq 0 \\ 0, & \text{elsewhere,} \end{cases} \quad (8)$$

i.e, i(t)=1 for all $t \in [0,1]$ when $(x_0, y_0)$ is inside the corresponding time-dependent edge equation. Note that the inside functions, $i_k(t)$, can be computed analytically by solving the second-degree polynomial in Equation 7.

For a moving triangle, we have three time-dependent edge functions, $e_k(t)$, where $k \in \{0,1,2\}$. The point $(x_0, y_0)$, will be inside the moving triangle when all inside functions are positive at the same time. This visibility function can be expressed as:

$$v(t) = i_0(t) i_1(t) i_2(t), \quad (9)$$

i.e., the multiplication of all three inside functions.

We derive the equation for the depth during the time span where the sample point, $(x_0, y_0)$, is inside the moving triangle. Perspective-correct interpolation coordinates (u,v), can be used to interpolate any attribute per vertex. This is done as:

$$s(u,v) = (1-u-v)p^0 + up^1 + vp^2, \quad (10)$$

where $p^k$ are the attribute vectors at the three vertices, and s(u,v) is the interpolated attribute vector. Edge equations, $e_k$, can be used to compute (u,v):

$$(u, v) = \frac{1}{e_0 + e_1 + e_2}(e_1, e_2). \qquad (11)$$

Note that u, v, and all $e_k$ are functions of $(x_0, y_0)$, but this was left out to shorten notation. Equation 11 also holds when time-dependent edge equations are used.

The depth buffer stores interpolated depth values. Assuming that $p^k = (p_x^k, p_y^k, p_z^k, p_w^k)$, $k \in \{0,1,2\}$, are the triangle vertices in clip space (before division by w), one first uses Equation 10, and then computes the depth as $d = s_z/s_w$ for a particular fragment with perspective-correct barycentric coordinates, (u,v).

When we turn from static triangles to moving triangles, $p^k$ are functions of time (Equation 2), and so are the edge equations. Let us first take a look at one of the texture coordinates, u (see Equation 11):

$$u = \frac{e_1}{e_0 + e_1 + e_2} \qquad (12)$$
$$= \frac{\alpha_1 t^2 + \beta_1 t + \gamma_1}{(\alpha_0 + \alpha_1 + \alpha_2)t^2 + (\beta_0 + \beta_1 + \beta_2)t + \gamma_0 + \gamma_1 + \gamma_2},$$

where the three time-dependent edge equations are: $\alpha_k t^2 + \beta_k t + \gamma_k$ (Equation 7). The texture coordinate, u, becomes a rational polynomial of degree two in t. The major difference, when compared to static triangles, is when the entire depth function is put together, $$d(t) = \frac{s_z}{s_w} = \frac{(1-u-v)p_z^0 + up_z^1 + vp_z^2}{(1-u-v)p_w^0 + up_w^1 + vp_w^2}, \qquad (13)$$

where all $p_z^i$ and $p_w^i$ are functions of time according to Equation 2, and u and v are functions of time (Equation 12) as well. When these expressions replacing the corresponding terms in Equation 13, we arrive at a cubic rational polynomial for the depth function for a certain sample point, $(x_0, y_0)$:

$$d(t) = \frac{m_3 t^3 + m_2 t^2 + m_1 t + m_0}{n_3 t^3 + n_2 t^2 + n_1 t + n_0}, \qquad (14)$$

Two of the advantages of using $d = s_z/s_w$ include the fact that the depth is in the range [0,1] due to the way the projection matrix is set up and that depth buffer compression can therefore be implemented efficiently since the depth will be linear over a triangle. Also, $d = s_z$ can be used, which will generate the same images, but the depth will now range between the near and the far plane: $[Z_{near}, Z_{far}]$. This simplifies the depth function for moving triangles. It will still be a rational function in t with degree three in the numerator, but the degree in the denominator will be reduced to two, that is:

$$d(t) = \frac{m_3 t^3 + m_2 t^2 + m_1 t + m_0}{n_2 t^2 + n_1 t + n_0}, \qquad (15)$$

In theory, the intersection of three inside functions of the visibility function can result in at most four disjoint time spans where the resulting function, v(t), is positive. This is because each inside function can consist of two disjoint positive parts. In practice, we have only encountered three intervals when you consider front-facing triangles for any value of t. Most commonly, only a single interval is generated for most triangles and samples, however.

The term "interval" denotes a range in the time dimension, together with the color and depth for that time range. An interval is denoted by $\Delta$. In practice, the third-degree rational depth function (Equation 15), is approximated by a linear function. The motivation for this is that the depth function rarely varies much beyond such an approximation within a pixel, and it makes computations much faster. In addition, we have good experiences with this approximation.

Figure 2:
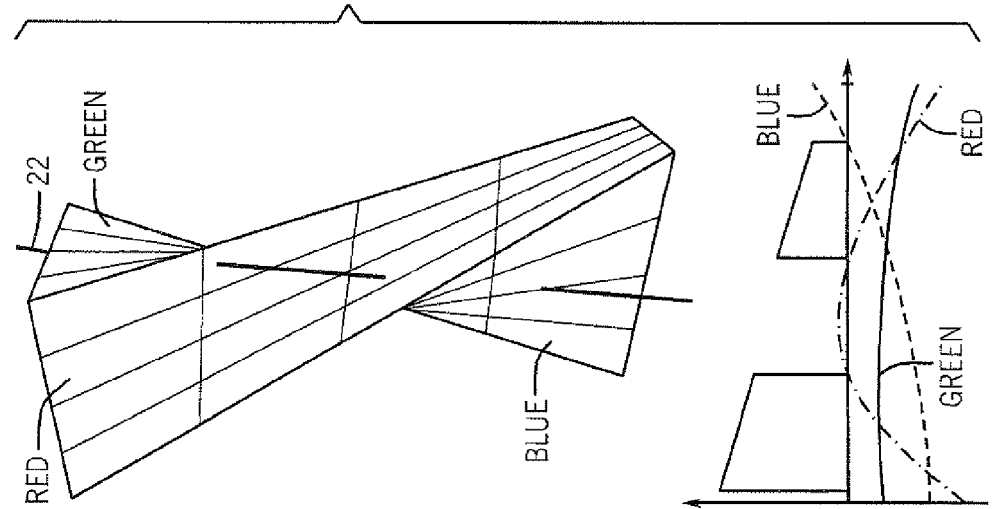

Given the depth function approximation, each interval stores the following parameters:

$t_i^s$: time at the beginning of the interval $t_i^e$: time at the end of the interval $z_i$: depth at the beginning of the interval $k_i$: slope of the depth function $c_i$: color of the interval $\qquad (16)$ Our interval is analogous to a fragment in rendering without motion blur, and an example of an interval is shown in FIGS. 1 and 2. In FIG. 1, the sample point 22 is inside the moving triangle in two disjoint time intervals, as shown by the depth function below. In FIG. 2, the sample point 24 is inside in three disjoint time intervals. In general, all intervals belonging to a pixel are simply stored in an interval list in that pixel, similar to how order-independent transparency is done with DX11 using graphics processing units. A couple of optimizations that can be used for opaque rendering will be described below. As a triangle that covers a pixel is rendered, one or more intervals are added to that pixel's interval list. When rendering starts, each pixel is initialized with an interval with background color and depth equal to the far plane.

Figure 3:
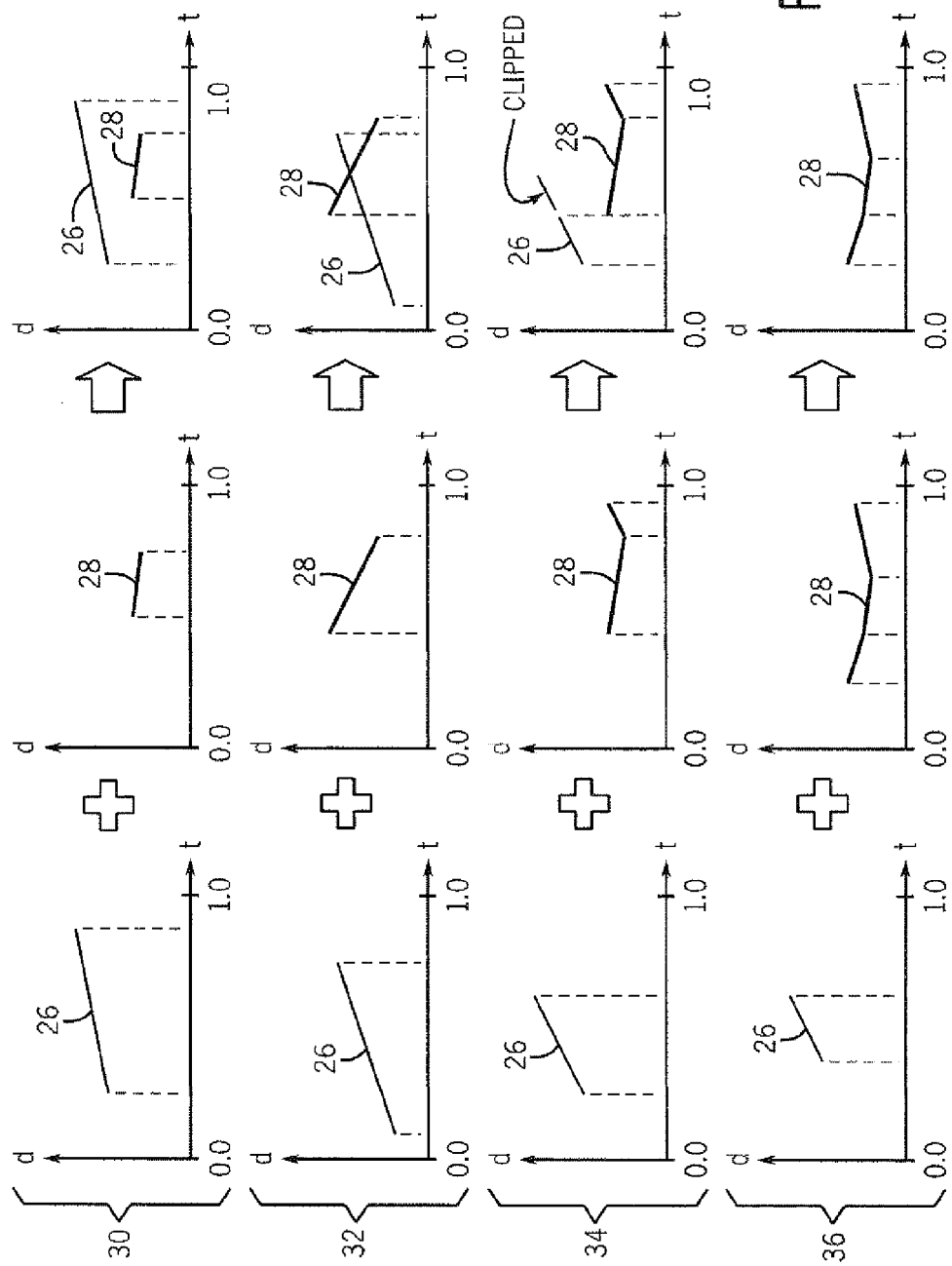
FIG. 3 depicts interval insertion over four cases.

Interval insertion is illustrated in FIG. 3. New intervals 26 are inserted into the existing interval list 28. At 30, clipping the interval 26 would result in the existing interval 28 and two intervals 26, one on each side of interval 28. At 32, for intersections, the new interval is also added to the pixel's interval list. At 34 and 36, optimizations valid only for opaque rendering with a LESS_EQUAL depth test are shown.

Our approach is based on trying to keep the number of intervals stored per pixel small, and to facilitate compression when possible. When two intervals intersect, one can use clipping to create non-overlapping (in time) intervals. However, that can generate up to four intervals, which is undesirable. An intersection can also generate only two intervals, but in such cases, we also refrain from clipping since our compression mechanism works better with unclipped intervals. Note that using non-clipped intervals requires a slightly more complex resolve procedure. For opaque rendering, simple depth test optimizations can he included in this process as well, and this is shown in the bottom two illustrations 34 and 36 of FIG. 3, where we have assumed that a LESS_EQUAL depth test is used. It is, however, straightforward to adapt to any depth function. In the second illustration from the bottom, the interval 26 is clipped in time since it is occluded and because the clipping only generate one interval, i.e., it does not require more storage than simply storing the unclipped interval.

Note that to facilitate depth testing, we keep the intervals sorted on $t_s^i$ per pixel. This can be done during interval insertion using insertion sort, for example.

Figure 5:
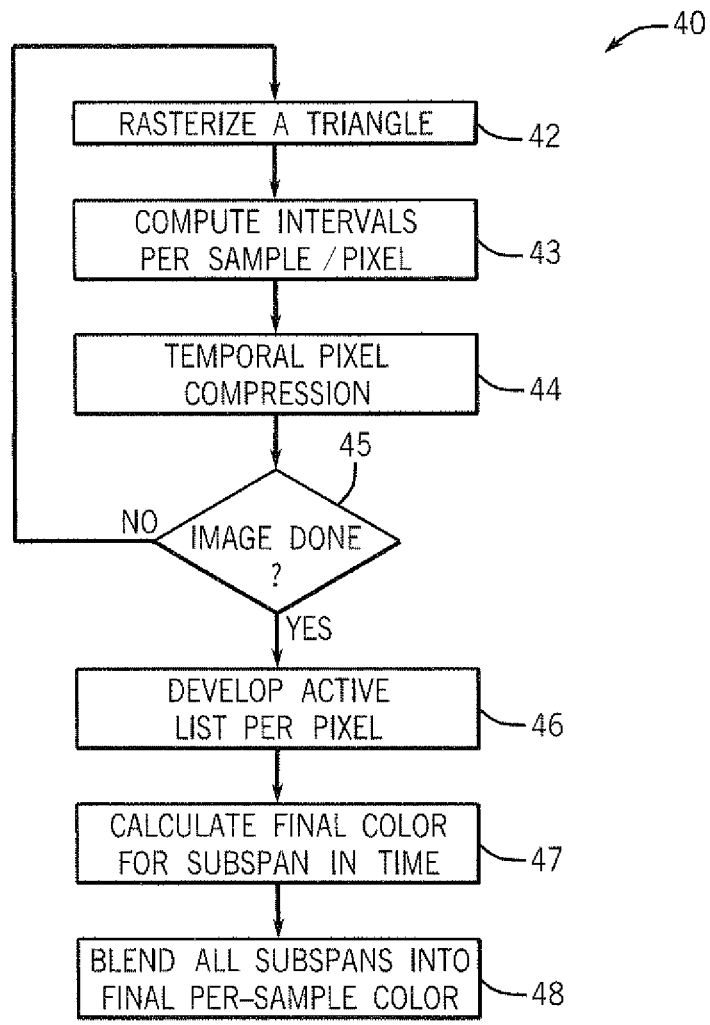
FIG. 5 is a flow chart for one embodiment.

A rasterization with compression sequence 40, shown in FIG. 5, begins by rasterizing a triangle (block 42) and then the intervals are computed per sample or pixel (block 43). Then, using an oracle function and interval merging, temporal pixel compression may be done in some embodiments (block 44). If the image is done, the flow moves to the resolve pass. Otherwise, it iterates back to rasterizing another triangle in block 42.

After rendering all moving and non-moving triangles, as indicated in FIG. 5 at block 42, we have a list of possibly overlapping (in time) intervals, $\Delta_i$, per pixel. Recall that we keep the intervals sorted, i.e., $t_s^i \leq t_s^{i+1}, \forall i$, since this is part of the interval insertion step described above.

The resolve pass (blocks 46, 47 and 48) processes a pixel independently of other pixels, and sweeps the sorted intervals in a pixel from time t=0 to t=1. During the sweep, we maintain a list, called Active List, per pixel of all intervals overlapping the current time of the sweep, as indicated in block 46 of FIG. 5. For example, when the sweep starts, at t=0, the Active List is initialized to hold all intervals that overlap t=0. Note that the Active List is also kept sorted on depth. As an interval start-point, $t_i^s$, or end-point, $t_i^e$, or an intersection point between two intervals is encountered, the following action is taken:

Interval-Start: insertion and sort (on depth) new interval into Active List.

Interval-End: remove interval from Active List.

Interval-Intersection: swap places of the intersecting intervals in the Active List to maintain depth order.

Between each pair of encounters (the three eases above), the final color for that particular subspan in time is computed (FIG. 5, block 47). Each such color and subspan in time is temporarily put into a resolved interval, $\Delta_k$. Since intersection points are handled as part of the sweep, there will not be any intervals overlapping in depth in the Active List. As a consequence of that, the color of $\Delta_k$ for opaque rendering is simply the color of the nearest (in depth) interval in the Active List, again assuming that a LESS_EQUAL depth test is used. Each resolved interval's color, $c_k$, is then integrated against the shutter response function, w(t), and added to the final color of the pixel. This can be expressed as:

$$c_{final} = \sum_{k=0}^{n-1} \left( \int_{t_k^s}^{t_k^e} w(t) c_k \, dt \right), \quad (17)$$

for n disjoint intervals. If a box filter is used, the colors of all intervals are simply combined into one final color weighted by their duration in time.

For the transparent resolve procedure, the only difference is that the color, $c_k$, of the resolved interval, $\Delta_k$, is computed by blending the intervals in the Active List in back-to-front order based on the alpha component of each color.

When there are many small triangles with a relatively high degree of motion blur, each pixel may need to store a large number of intervals, $\Delta_i$, in order to exactly represent the color of the pixel. We have observed up to a few hundred intervals per pixel in extreme cases. This is clearly not desirable for a rasterization-based algorithm due to the extra pressure on the memory subsystem, that is, increased memory bandwidth usage. The problem can be alleviated by using a tiling architecture, where the triangles are sorted into tiles (rectangular regions of pixels) by front-end pass, and per-pixel rendering done in a back-end pass. Tiles can be back-end processed in parallel by separate cores, since the rasterization and per-pixel work is independent at this point. However, a tiling architecture cannot solve the problem. Instead, we use glossy compression of intervals.

Figure 4:
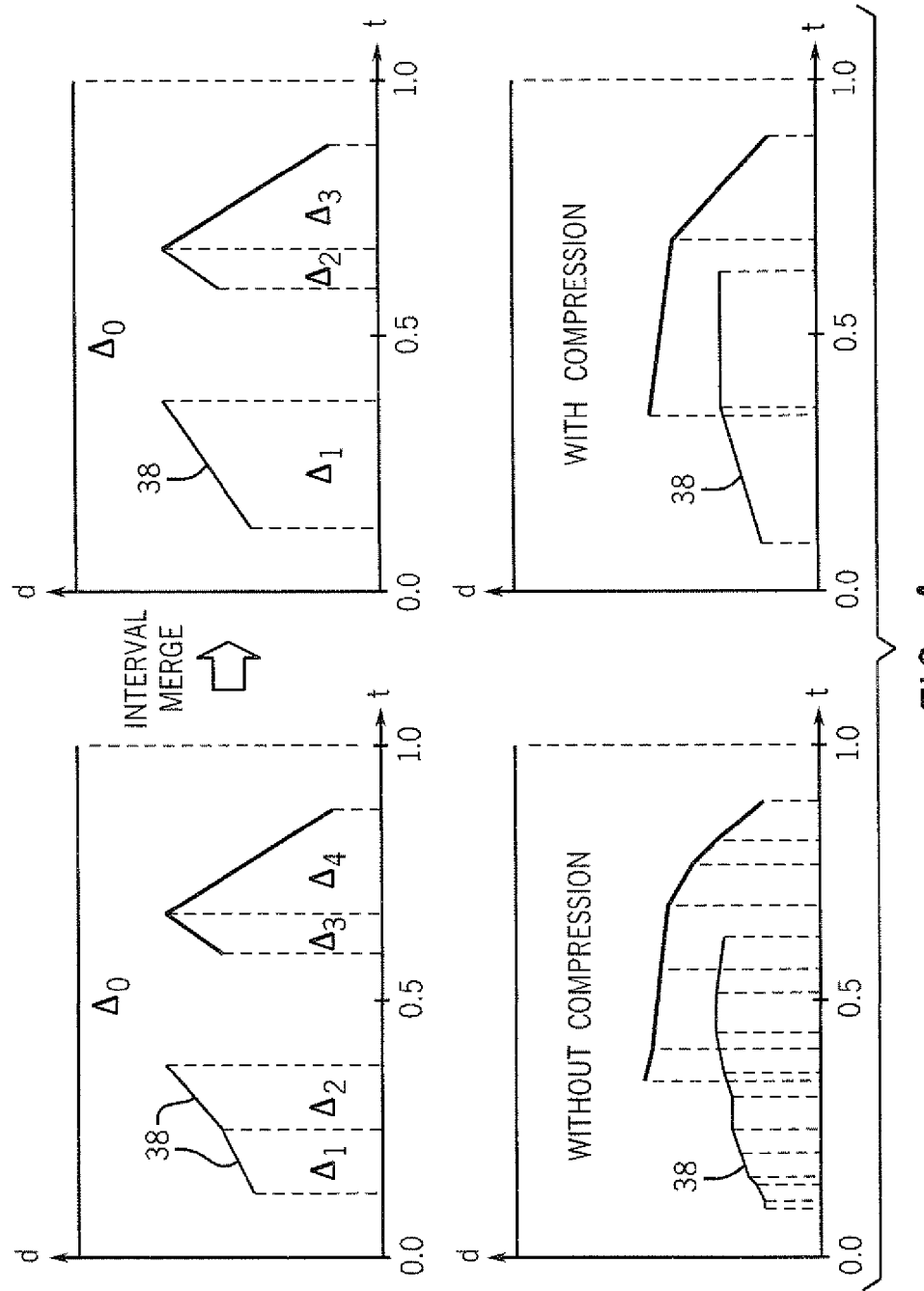
FIG. 4 depicts merging two depth functions with similar depth functions, showing results with and without compression.

Merging intervals are illustrated in the top part of FIG. 4. Since the intervals 38 have similar depth functions, they are merge candidates. Assume that a pixel can only "afford" to store four intervals, and that after rendering another motion blurred triangle, the pixel actually holds five intervals (top left in FIG. 4). To be able to fit this into our frame buffer, we will need to compress this information into four intervals again. This is shown in the top right part of the figure, where the two intervals 38 with similar depth functions have been merged to a single interval. A similar type of compression has been used for deep shadow maps, but in their context, compression was only needed to be done once after the entire visibility function was known. Our goal is different since we may need to compress each pixel several times as more and more triangles are rendered to a pixel and, in addition, we compress not only depth, but may also take into account the colors, the actual depth functions, the extent of the intervals, etc. The bottom left graph illustrates pixel content after rendering many small moving triangles. The bottom right graph is a possible result using our compression algorithm. Finally, all sub-spans are blended together into a final per-sample color (FIG. 5, block 48).

We use an oracle-based approach to attack this problem. Our oracle function is denoted:

$$o_{i,j} = O(\Delta_i, \Delta_j), \quad (18)$$

where the oracle function, O( ) operates on two intervals, $\Delta_i$ and $\Delta_j$, where i<j. The task of the oracle is basically to compute an estimation on how appropriate it is to merge the two input intervals. Given an oracle function, O, we compute oracle function values, $o_{i,j}$, for all i, and j∈{i+1,i+2,i+3}. For transparent scenes with a high level of depth overlap, we have increased the search range up to +10, instead of +3. In the next step, the interval pair with the lowest $o_{i,j}$ is merged. Depending on the implementation, this process may continue until the number of intervals per pixel falls in a desired range, or until there are no more appropriate merges possible. Next, we describe an oracle, for two intervals, that generates a lower value the more appropriate they are to merge.

Our oracle function, O, may be described, for example, by the following formula, where i<j:

$$O(\Delta_i, \Delta_j) = h_1 \max(t_j^s - t_i^e, 0) + h_2 |\overline{z}_i - z_j| + h_3 |k_i - k_j| + h_4 (t_i^e - t_i^s + t_j^e - t_j^s) + h_5 (|c_{i,r} - c_{j,r}| + |c_{i,g} - c_{j,g}| + |c_{i,b} - c_{j,b}|). \quad (19)$$

The first term favors merging of intervals that are located close in time (even overlapping). The second term $\overline{z}_i$ is the depth at the end of $\Delta_i$, i.e., $\overline{z}_i = z_i + k_i(t_i^{e-t_j^s})$, and $z_j$ is the depth at the beginning of the other interval, $\Delta_j$. See Equation 16 for definitions of the interval's parameters. The third term penalizes merging of intervals with different slopes. Hence, both the second and third terms attempt to detect if the depth functions are similar, and therefore, whether they are amenable for merging. The fourth term favors merging of short (in time) intervals, while the fifth favors merging of interval with similar colors. All $h_i$ are used-specified constants.

We will describe the merging of two intervals, $\Delta_i$ and $\Delta'_j$, into a new interval, $\Delta'_i$. The merge is described as: $\Delta'_i$=merge$(\Delta_i, \Delta_j)$, i<j, where the new parameters are:

$$t'^s_i = t_i^s$$

$$t'^e_i = \max(t_i^e, t_j^e)$$

$$z'_i = (1-\alpha)z_i + \alpha(z_j - k_j(t_j^s t_i^s))$$

$$k'_i = (1-\alpha)k_i + \alpha k_j$$

$$c'_i = (1-\alpha)c_i + \alpha c_j, \quad (20)$$

where $\alpha = (t_j^e - t_j^s)/(t_i^e - t_i^s + t_j^e - t_j^s)$ is used to linearly blend parameters depending on the lengths (in time) of the intervals that are merged. As can be seen, the slope, $k'_i$ of the depth function, and the color, $c'_i$, are simply linear interpolations of the input intervals' parameters. The depth, $z'_i$, is slightly more complex because we need to blend the depth at the same instant in time. Since we want the new depth at time $t_i^s$, we compute the depth of $\Delta_j$'s depth function at $t_i^s$ and use that for blending. For future work, it would be interesting to investigate other approaches to depth merging, e.g., where the area under the depth function is kept constant after compression. An example of merging two intervals is shown in FIG. 4.

Figure 6:
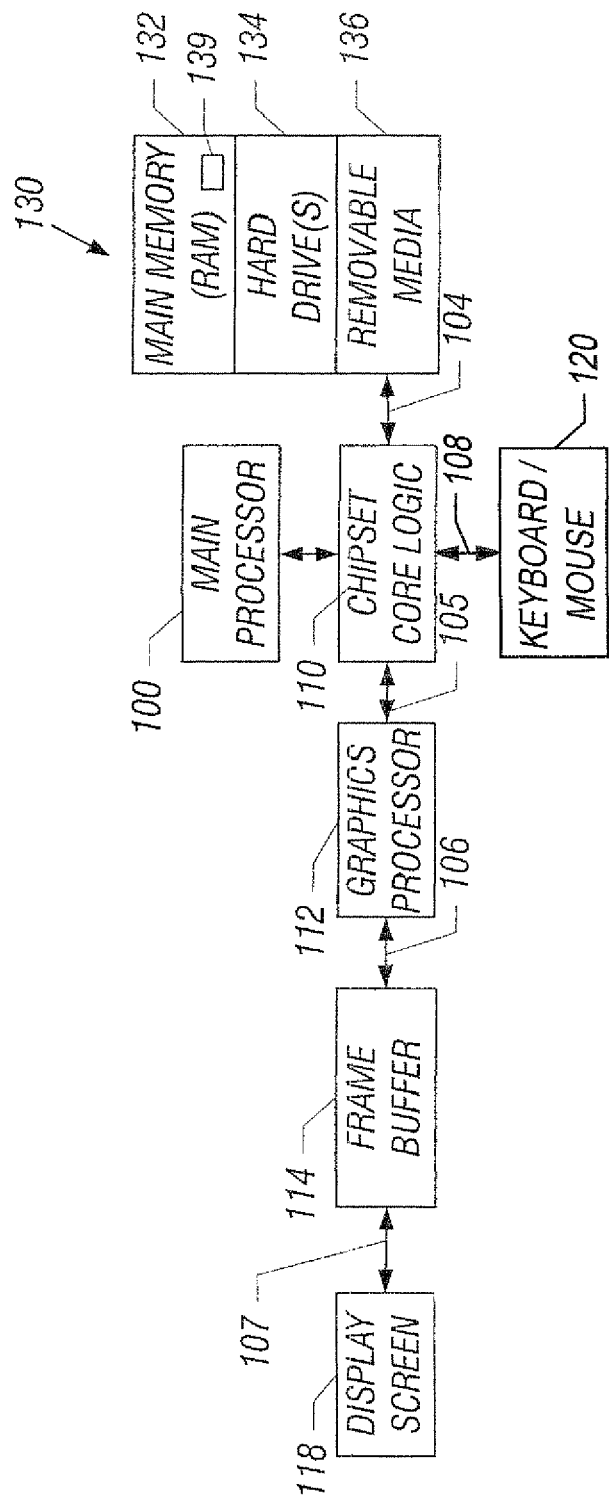
FIG. 6 is a hardware depiction for one embodiment.

The computer system 130, shown in FIG. 6, may include a hard drive 134 and a removable media 136, coupled by a bus 104 to a chipset core logic 110. A keyboard and mouse 120, or other conventional components, may be coupled to the chipset core logic via bus 108. The core logic may couple to the graphics processor 112, via a bus 105, and the main or host processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code 139 may be stored in any suitable semiconductor, magnetic, or optical memory, including the main memory 132 or any available memory within the graphics processor. Thus, in one embodiment, the code to perform the sequences of FIG. 5 may be stored in a machine or computer readable medium, such as the memory 132 or the graphics processor 112, and may be executed by the processor 100 or the graphics processor 112 in one embodiment.

FIG. 5 is a flow chart. In some embodiments, the sequences depicted in this flow chart may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIG. 5.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of rasterizing a motion blurred triangle comprising:
   using a computer to analytically determine a time interval of overlap for a sample point for each of a plurality of time dependent edge equations;
   storing, for said interval, when the sample point is inside a moving triangle;
   approximating a rational depth function for said interval as a linear function; and
   storing, for said interval, parameters of the linear function, the parameters including a depth at a point in the interval, a slope of a depth function of the interval, a color of the interval and times at the beginning and end of the interval,
   wherein if a number of stored intervals per pixel exceeds a threshold value;
   estimating a similarity between each of the stored intervals based on their respective stored parameters; and
   merging the two stored intervals having the highest similarity until the number of stored intervals per pixel is less than or equal to the threshold value.

2. The method of claim 1 including storing said interval in a per sample list.

3. The method of claim 2 including using temporal pixel compression.

4. The method of claim 1, including determining a final pixel color by weighting, based upon time duration and visibility, the colors of the stored intervals for a given pixel.

5. The method of claim 1, wherein the estimation favors intervals that are close in time.

6. The method of claim 1, wherein the estimation penalizes intervals having different slopes.

7. The method of claim 1, wherein the estimation favors intervals with similar depth functions.

8. A non-transitory computer readable medium storing instructions to enable a computer to rasterize motion blurred triangles by:
   analytically determining a time interval of overlap for a sample point for each of three time dependent edge equations;
   storing, for said interval, when the sample point is inside a moving triangle;
   approximating a rational depth function for said interval as a linear function; and
   storing, for said interval, parameters of the linear function, the parameters including a depth at a point in the interval, a slope of a depth function of the interval, a color of the interval, and times at the beginning and end of the interval,
   wherein if a number of stored intervals per pixel exceeds a threshold value;
   estimating a similarity between each of the stored intervals based on their respective stored parameters; and
   merging the two stored intervals having the highest similarity until the number of stored intervals per pixel is less than or equal to the threshold value.

9. The medium of claim 8 further storing instructions to store said intervals in a per sample list.

10. The medium of claim 9 further storing instructions to use temporal pixel compression.

11. The medium of claim 10 further storing instructions to compress using a function.

12. The medium of claim 8 further storing instructions to use clipping to create a non-overlapping in time interval where two time intervals intersect.

13. The medium of claim 12 further storing instructions to develop a first list of possible time overlapping intervals after rendering triangles.

14. The medium of claim 13 further storing instructions to sort intervals based on time and develop a second list of time overlapping intervals and sweeping the sorted intervals.

15. The medium of claim 14 further storing instructions to sort said second list based on depth.

16. The medium of claim 15 further storing instructions to perform insertion and sort based on depth in said second list upon detecting a new interval.

17. An apparatus comprising: a processor to analytically determine a time interval of overlap for a sample point for each of a plurality of time dependent edge equations, store, for said interval, when the sample point is inside a moving triangle, approximate a rational depth function for said interval as a linear function and store for said interval parameters of the linear function, the parameters including a depth at a point in the interval, a slope of the depth function, a color of the interval, and times at the beginning and end of the interval; and a storage medium coupled to said processor, wherein if a number of stored intervals per pixel exceeds a threshold value;

estimating a similarity between each of the stored intervals based on their respective stored parameters; and merging the two stored intervals having the highest similarity until the number of stored intervals per pixel is less than or equal to the threshold value.

18. The apparatus of claim 17 including said processor to store said intervals in a per sample list.

19. The apparatus of claim 18 including said processor to use temporal pixel compression.

20. The method of claim 17, including said processor to determine a final pixel color by weighting, based upon time duration and visibility, the colors of the stored intervals for a given pixel.

* * * * *